US 6,516,937 B1

(12) United States Patent
Deer

(10) Patent No.: US 6,516,937 B1
(45) Date of Patent: Feb. 11, 2003

(54) UNDER ROLLER CONVEYOR PUSHER ASSEMBLY

(75) Inventor: David A. Deer, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/150,837

(22) Filed: May 17, 2002

(51) Int. Cl.[7] .............................................. B65G 47/46
(52) U.S. Cl. ................................. 198/370.07; 198/597
(58) Field of Search ....................... 198/370.02, 370.07, 198/597, 468.9

(56) References Cited

U.S. PATENT DOCUMENTS

| | | | | |
|---|---|---|---|---|
| 3,333,675 A | * | 8/1967 | Lord | 198/370.02 |
| 3,422,948 A | * | 1/1969 | Burt | 198/370.07 |
| 3,621,973 A | * | 11/1971 | Carlson et al. | 198/597 X |
| 5,165,519 A | | 11/1992 | Pund et al. | |
| 5,464,088 A | | 11/1995 | Koerber | |
| 5,779,026 A | | 7/1998 | Hosch et al. | |
| 5,893,447 A | | 4/1999 | Brintazzoli | |
| 5,971,132 A | | 10/1999 | Bonnet | |

FOREIGN PATENT DOCUMENTS

JP          2169411          6/1990

* cited by examiner

Primary Examiner—James R. Bidwell
(74) Attorney, Agent, or Firm—Michael Best & Friedrich, LLP

(57) ABSTRACT

An article pusher assembly for use with a roller conveyor having a plurality of parallel rollers that define a conveying surface having opposed sides at a given distance. The pusher assembly comprises a carriage assembly mounted under the conveying surface. The carriage assembly includes first and second carriages. A pusher blade is positioned with a contact portion above the conveying surface and at least one post extending between a pair of adjacent rollers and connected to the one of the carriages. A drive unit is mounted under the conveying surface selectively drives the carriage assembly. A multiplier unit interconnects the first and second carriages and is configured to move the first carriage relative to the second carriage in direct relation to movement of the second carriage.

20 Claims, 4 Drawing Sheets

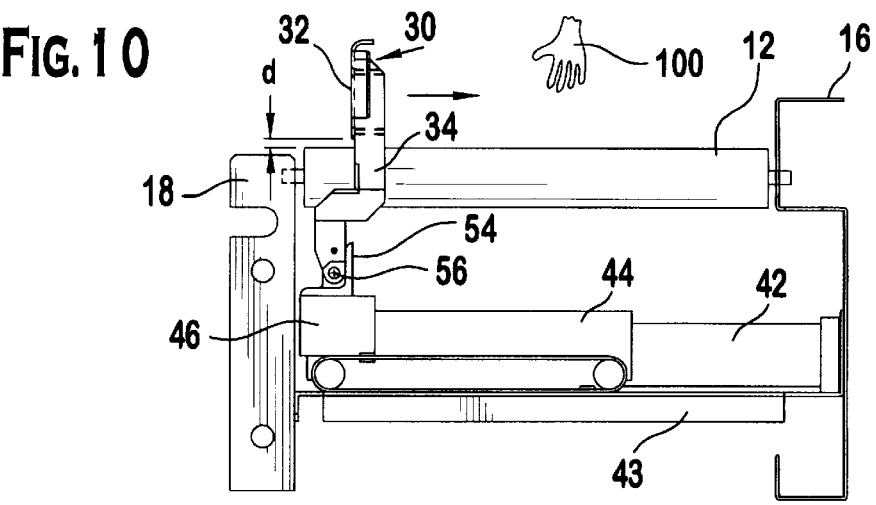
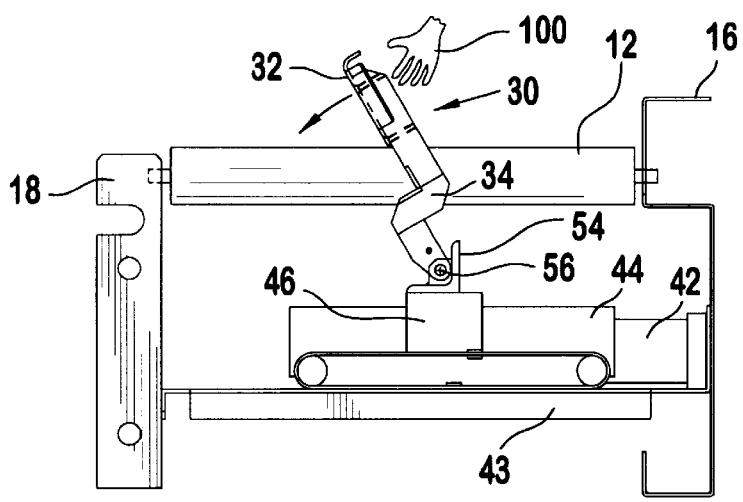
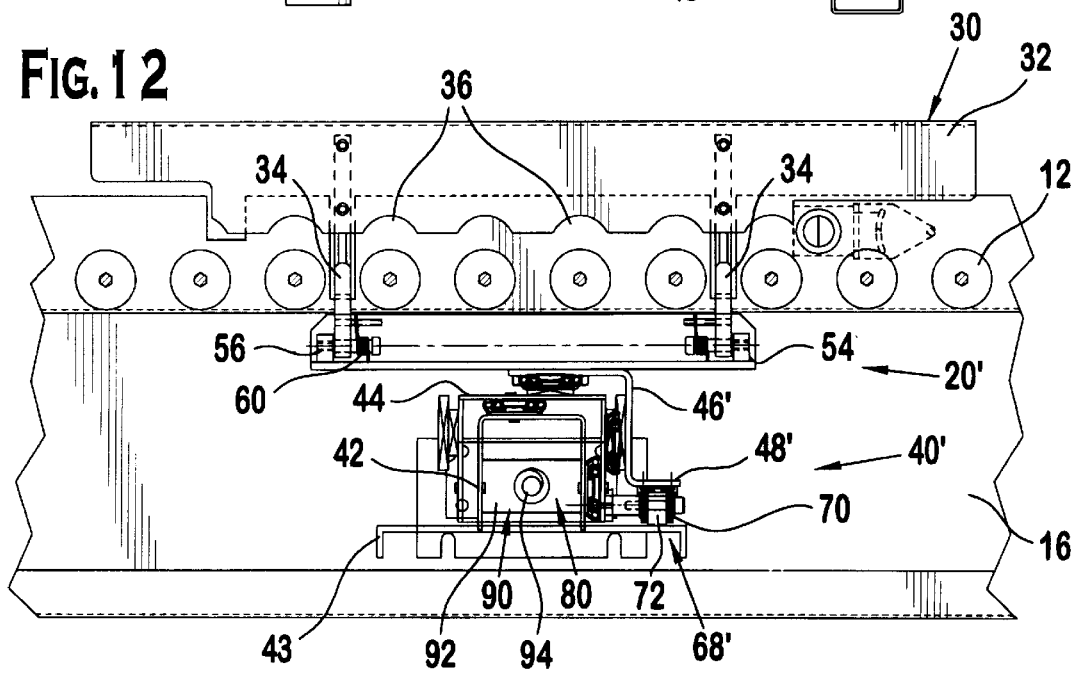

UNDER ROLLER CONVEYOR PUSHER ASSEMBLY

BACKGROUND

The present invention relates to conveyor pushers. More particularly, the present invention relates to a pusher assembly mounted on the underside of a roller conveyor.

Package delivery companies pick up millions of packages daily from thousands of locations over a large geographical area and transport them to sorting facilities, primarily by truck and airplane, so they can be routed to a correspondingly large number of scattered destinations. To meet a rigorous schedule and provide accurate deliveries, a package delivery company must use automated transfer systems in the sorting facilities to match incoming packages with proper outgoing transport headed for the packages' destinations. Because deliveries are time sensitive, the sorting equipment must be very fast, yet provide gentle and accurate handling of packages.

Belt and roller conveyor systems have often been used in package sorting systems to move packages from incoming loading docks to outgoing transport. An initial sorting of packages traveling along a conveyor may be accomplished by diverting packages from the conveyor based on their destinations, or based on their size or another characteristic.

To automate handling of articles traveling on conveyor systems, conveyor diverter assemblies of various types have been developed. Several systems have been developed to push articles off conveyors with pushing arms that sweep directly across the conveyors. Examples of such systems are shown in U.S. Pat. Nos. 3,026,988, 4,295,559, and 4,732,260. These pushers generally mount over or on the side of the conveyor. The pushers also often require special guarding to protect operators from the moving pusher. Both of these characteristics generally limit access to the conveyor.

SUMMARY

The present invention relates to an article pusher assembly for use with a roller conveyor having a plurality of parallel rollers that define a conveying surface having opposed sides at a given distance. The pusher assembly generally comprises a carriage assembly adapted to be mounted under the conveying surface. A pusher blade is adapted to be positioned such that a portion thereof is generally above the conveying surface and at least one portion extends between a pair of adjacent rollers and connects to the carriage assembly. A drive unit is adapted to be mounted under the conveying surface and to selectively drive the carriage assembly.

The carriage assembly preferably includes first and second carriages. A multiplier unit interconnects the first and second carriages and is configured to move the first carriage relative to the second carriage in direct relation to movement of the second carriage. The preferred carriage assembly further includes a biasing member positioned between the carriage and the pusher blade such that the pusher blade is generally maintained in, but deflectable from, a plane parallel to the conveying surface.

BRIEF DESCRIPTION OF THE DRAWINGS

FIGS. 10 and 11 are side schematics illustrating deflection of the preferred pusher assembly as it returns to the home position.

FIG. 12 is a cross sectional view similar to FIG. 2 illustrating a second embodiment of the present invention.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
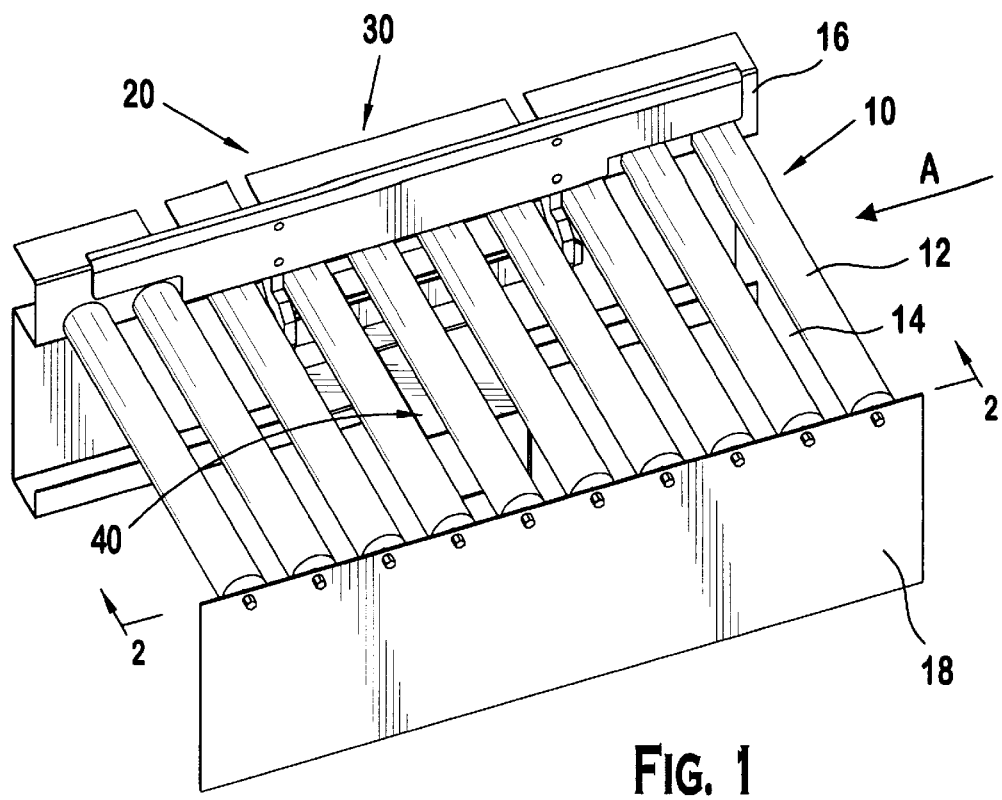
FIG. 1 is an isometric view of a roller conveyor assembly incorporating a pusher assembly according to a first embodiment of the present invention.
Figure 2:
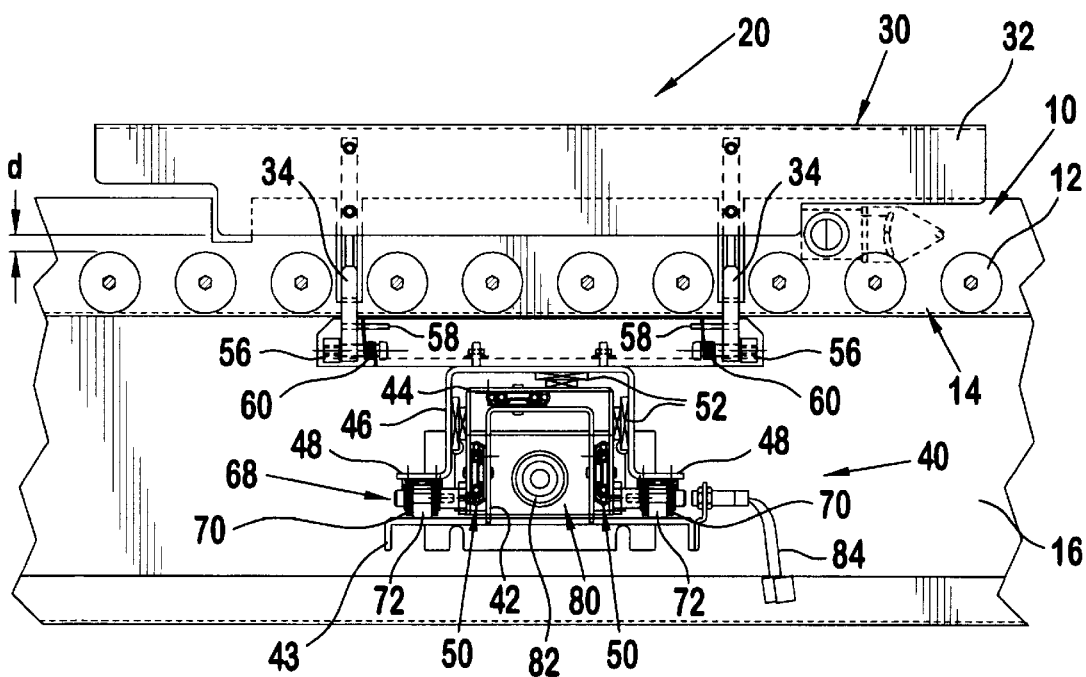
FIG. 2 is a cross sectional view along line 2—2 in FIG. 1.
Figure 3:
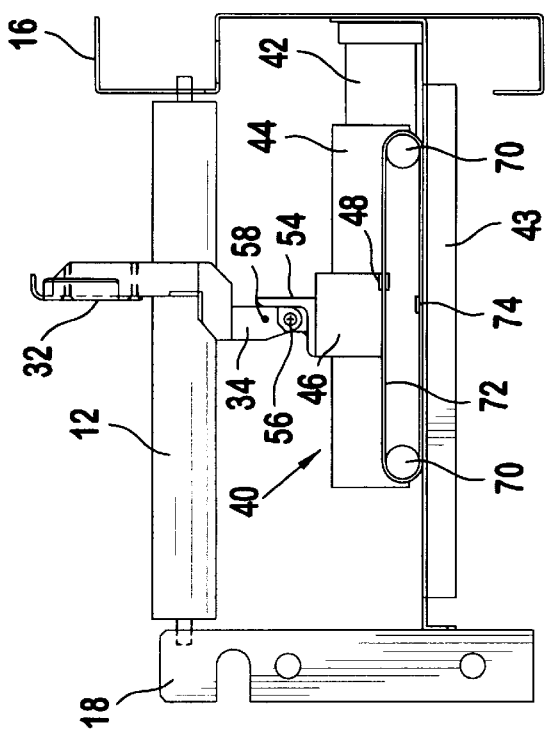
FIGS. 3 and 4 are side and top, respectively, schematics illustrating the pusher assembly in a home position.
Figure 4:
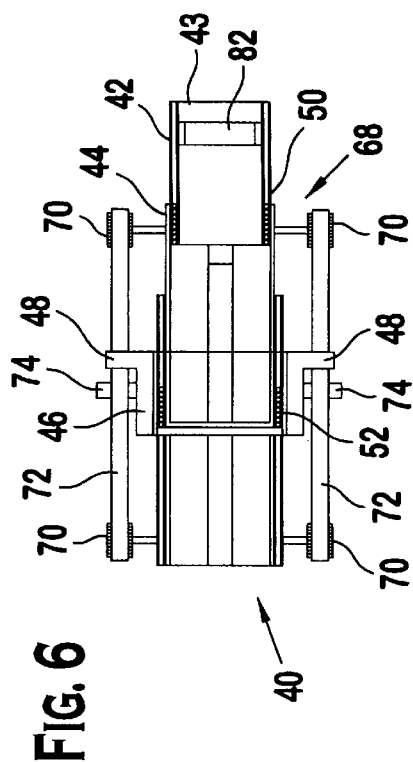
Figure 5:
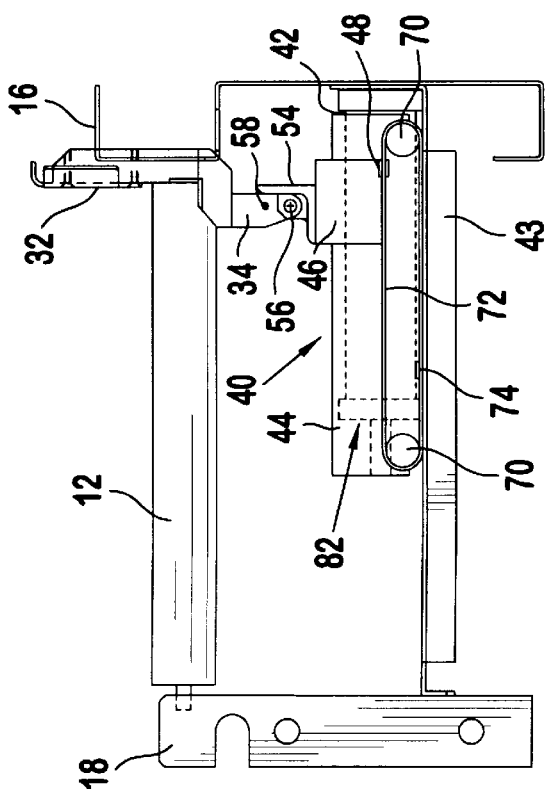
FIGS. 5 and 6 are side and top, respectively, schematics illustrating the pusher assembly moving across the conveyor.
Figure 6:
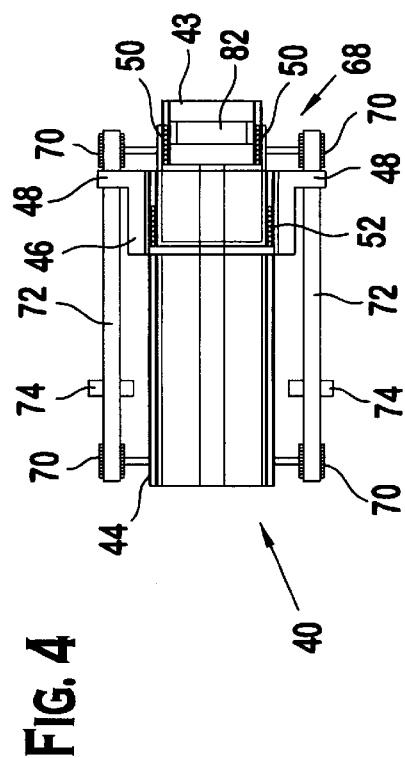

A preferred embodiment of the present invention will be described with reference to FIGS. 1–9. Referring specifically to FIGS. 1 and 2, the pusher assembly 20 of the preferred embodiment is shown positioned relative to a roller conveyor 10. The roller conveyor 10 generally comprises a plurality of parallel rollers 12 supported between opposed frame members 16 and 18. There is an open space 14 between each pair of adjacent rollers 12. Articles (not shown) generally travel along the conveyor 10 in the direction of arrow A in FIG. 1.

The pusher assembly 20 generally comprises a pusher blade 30, a carriage assembly 40 and a drive unit 80. The pusher blade 30 includes a contact surface 32 that is supported above the conveyor rollers 12 by a pair of posts 34. The contact surface 32 is configured to sit slightly above the conveyor rollers 12 and to move across the conveyor 10 to divert articles substantially perpendicular to the direction of travel A of the conveyor 10.

The carriage assembly 40 will be described with reference to FIGS. 2–9. The carriage assembly 40 includes a base frame 42 and 43 fixed under the conveyor 10 between the conveyor frame members 16 and 18. In the illustrated embodiment, the base frame member 42 extends from frame member 16 to the approximate midpoint of the conveyor 10 and member 43 extends from frame member 16 to the opposed frame member 18, but the base frame 42 and 43 may be cantilevered or may otherwise be supported under the conveyor 10.

An inner carriage 44 is configured to fit about and ride along the base frame member 42. Roller bearings 50 or the like may be positioned between the base frame member 42 and the inner carriage 44 to facilitate smooth, relative movement therebetween. An outer carriage 46 is configured to fit about and ride along the inner carriage 44. Again, roller bearings 52 or the like may be positioned between the inner carriage 44 and the outer carriage 46 to facilitate smooth, relative movement therebetween.

A pusher blade support bracket 54 is attached to and moves with the outer carriage 46. The pusher blade posts 34 extend through the spaces 14 between rollers 12 and are pivotally connected to the support bracket 54 at pivot points 56. A biasing element 60, for example a coil or torsion spring, extends between the bracket 54 and an arm 58 extending from each post 34. The biasing elements 60 maintain the posts 34, and thereby the contact surface 32, in a default position substantially perpendicular to the conveyor 10 surface. The biasing elements 60 however allow the pusher blade 30 to deflect in the event the blade 30 makes undesired contact with an object, as will be described hereinafter.

The carriage assembly 40 is driven by a drive unit 80 positioned within the base frame member 42. The drive unit 80 illustrated in FIG. 2 includes a fluid cylinder 82, for example, a pneumatic cylinder, that extends and retracts in response to signals from control circuitry 84. The cylinder rod of the fluid cylinder 82 is associated with the inner carriage 44 such that extension and retraction of the cylinder rod moves the inner carriage 44 across the conveyor 10.

A multiplier unit 68 extends between the inner carriage 44 and the outer carriage 46. The preferred multiplier unit 68 preferably includes a pair of wheels 70 extending from each side of the inner carriage 44. A tensioned band 72, for example, timing belt or link band, extends between the wheels 70 on each side of the inner carriage 44. Referring to FIGS. 3–8, the wheels 70 move along with the inner carriage 44. A set point 74 fixes each band 72 to the base frame member 43. The outer carriage 46 includes a pair of outwardly extending flanges 48 that are attached to the respective bands 72. As the inner frame 44 is driven across the conveyor 10 and the wheels 70 move therewith, the bands 72 are also driven. Since the bands 72 are fixed to the base frame member 43 and also attached to the free outer carriage 46, the driven bands 72 cause the outer carriage 46 to move relative to the inner carriage 44.

Figure 9:
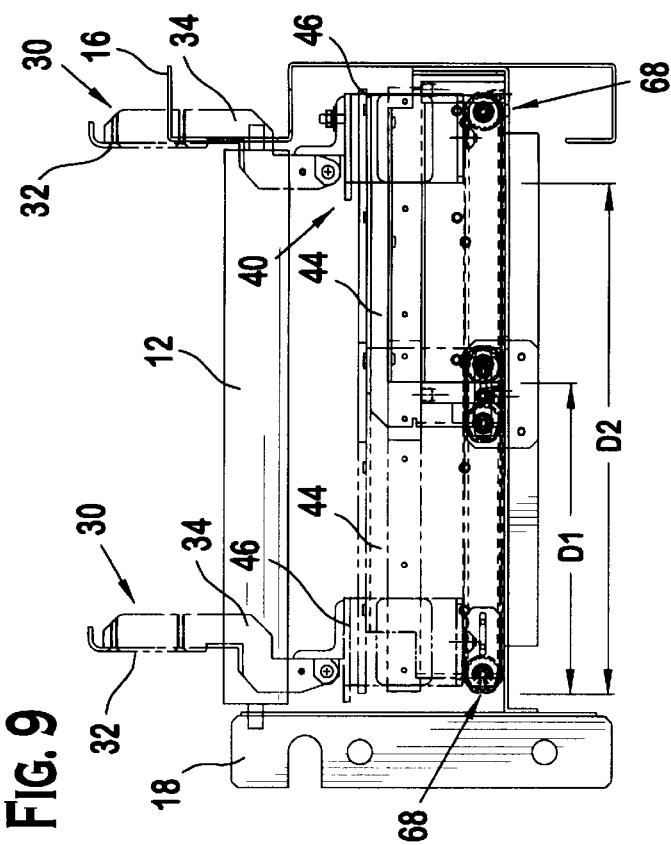
FIG. 9 is a side schematic illustrating the pusher assembly in the home position and the extended position (in phantom).
Figure 7:
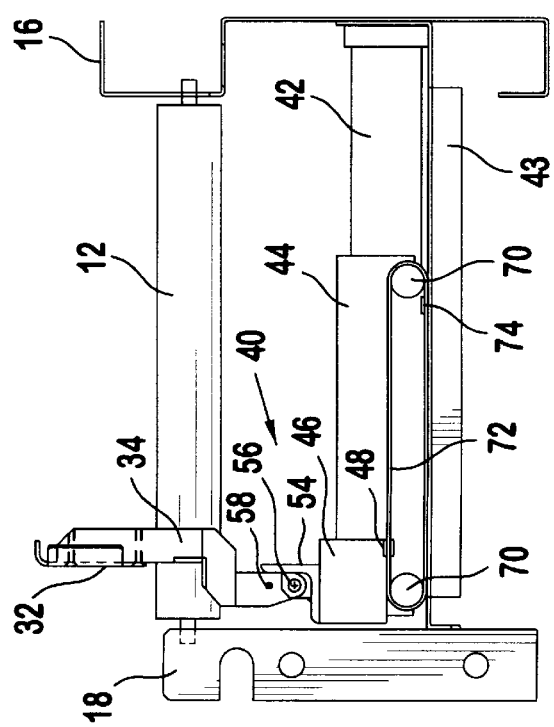
FIGS. 7 and 8 are side and top, respectively, schematics illustrating the pusher assembly in an extended position.
Figure 8:
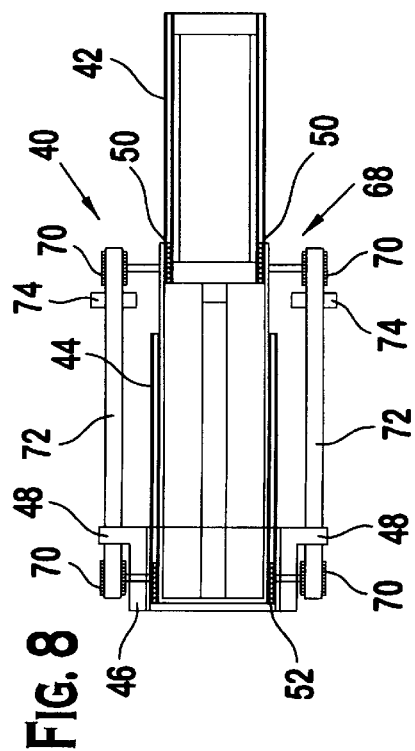

As illustrated in FIG. 9, as the inner carriage 44 moves from the home position to the extended position (in phantom), the inner carriage 44 moves a distance D1 approximately half the distance of the conveyor 10. As the inner carriage 44 moves the distance D1, the multiplier unit 68 causes the outer carriage 46 to move with and relative to the inner carriage 44, such that the outer carriage 46, and thereby the pusher blade 30, moves a greater distance D2, substantially completely across the conveyor 10.

Referring to FIGS. 10 and 11, deflection of the pusher blade 30 will be described. In the preferred embodiment, the support bracket 54 is L-shaped such that the posts 34 are prevented from rotating backward, thereby defining the limit position of the pusher blade 30. The pusher blade 30 can thereby push desired articles placed in front of the contact surface 32. However, as the pusher blade 30 returns to the home position, if an object 100, for example, an operators hand, is inadvertently positioned behind the pusher blade 30, the biasing members 60 allow the pusher assembly 30 to deflect forward as illustrated in FIG. 11. The biasing force of the biasing members 60 is preferably chosen to withstand the inertial force created against the blade 30 as it returns to the home position, but otherwise easily deflects to minimize the impact of the blade 30 against the object 100. Holes (not shown) may be provided in the contact surface 32 to reduce the return inertial force and further minimize the necessary biasing force.

As shown in FIGS. 2 and 10, the contact surface 32 is preferably spaced a slight distance d from the top of the conveyor rollers 12 to allow sufficient clearance for the pusher blade 30 to deflect. Referring to FIG. 12, detents 36 aligned with the rollers 12 may be provided along the lower edge of the contact surface 32 to further accommodate deflection of the pusher blade 30.

In addition to deflecting as the pusher blade 30 moves backward, the pusher assembly 20 may also be configured to deflect if an over weight object or the like is placed in front of the contact surface 32. For example, the support bracket 54 may be configured to allow rotation of the posts 34 both forward and backward. Support springs (not shown) can be provided to prevent reward rotation of the posts 34. The support springs will have a biasing force equal to the maximum weight to be pushed by the pusher assembly 20, for example, a biasing force equal to 150 pounds.

An alternative embodiment of the present invention is illustrated in FIG. 12. The pusher assembly 20' includes a pusher blade 30, a carriage assembly 40' and a drive unit 80. The pusher blade 30 is substantially the same as the pusher blade 30 in the above embodiment. The carriage assembly 40' is substantially the same as in the previous embodiment, except that the outer carriage 46' has an open configuration. Accordingly, the multiplier unit 68' is only provided on one side of the inner carriage 44. The drive unit 80 includes a ball lead screw 90 in place of the fluid cylinder. The ball lead screw 90 includes a linear screw 94 driven by an electric motor (not shown) or the like. The ball nut 92 positioned about the screw 94 is associated with the inner carriage 44 such that rotation of the screw 94 extends and retracts the inner carriage 44.

While the invention has been illustrated and described in detail in the drawings and foregoing description, the same is considered as illustrative and not restrictive in character, it being understood that only preferred embodiments have been shown and described and that there are many changes and modifications that come within the spirit of the invention.

What is claimed is:

1. An article pusher assembly for use with a roller conveyor having a plurality of parallel rollers that define a conveying surface having opposed first and second sides, the pusher assembly comprising:

a carriage assembly having first and second carriages, the carriage assembly adapted to be mounted under the conveying surface;

a pusher blade adapted to be positioned such that a portion thereof is generally above the conveying surface and at least one portion thereof extends between an adjacent pair of the rollers and connects to the first carriage;

a drive unit adapted to be mounted under the conveying surface and to selectively drive the second carriage; and a multiplier unit interconnecting the first and second carriages and configured to move the first carriage relative to the second carriage in relation to movement of the second carriage.

2. The article pusher assembly of claim 1 wherein the first carriage is moveable between a first position adjacent the first side of the conveying surface and a second position adjacent the second side of the conveying surface with the second carriage moving a distance less than a given distance between the first and second sides.

3. The article pusher assembly of claim 1 wherein the second carriage rides along a frame structure adapted to be positioned under the conveying surface.

4. The article pusher assembly of claim 3 wherein the first carriage rides along the second carriage assembly.

5. The article pusher assembly of claim 4 wherein respective bearing assemblies are positioned between the first carriage and the second carriage and the second carriage and the frame structure.

6. The article pusher assembly of claim 4 wherein the multiplier unit includes spaced apart wheels extending from the second carriage and a band positioned about the wheels and fixed at a first position to the frame structure and at a second position to the first carriage.

7. The article pusher assembly of claim 1 wherein the drive unit includes a fluid cylinder including an extendible rod associated with the second carriage.

8. The article pusher assembly of claim 1 wherein the drive unit includes a driveable ball lead screw including a ball nut associated with the second carriage.

9. An article pusher assembly for use with a roller conveyor having a plurality of parallel rollers that define a conveying surface having opposed first and second sides, the pusher assembly comprising:

a carriage adapted to be mounted under the conveying surface;

a pusher blade having a contact surface supported by at least two spaced apart posts, the pusher blade is adapted to be positioned such that the contact surface is generally above the conveying surface and each post extends between an adjacent pair of the rollers and is pivotally connected to the carriage assembly;

a biasing member positioned between the carriage and at least one of the posts such that the pusher blade is generally maintained in, but deflectable from, a plane parallel to the conveying surface; and a drive unit adapted to be mounted under the conveying surface and to selectively drive the carriage and thereby move the pusher blade mounted on the carriage back and forth between a first position adjacent one side of the conveying surface and a second position adjacent the opposite side of the conveying surface.

10. The article pusher assembly of claim 9 wherein the contact surface is generally defined by a flat plate.

11. The article pusher assembly of claim 10 wherein the flat plate has a lower edge that is spaced a distance above the conveying surface.

12. The article pusher assembly of claim 10 wherein the flat plate has a lower edge that includes a plurality of detents, each detent configured to align with a respective roller.

13. The article pusher assembly of claim 10 wherein the flat plate has a plurality of apertures therethrough.

14. The article pusher assembly of claim 9 wherein the carriage assembly includes a pair of support brackets each configured to receive and pivotally support a respective post.

15. The article pusher assembly of claim 14 wherein at least one of the support brackets has an L-shaped configuration which prevents the posts from rotating backward.

16. An article transfer assembly comprising:

a roller conveyor having a plurality of parallel rollers that define a conveying surface having opposed first and second sides;

a carriage assembly having first and second carriages mounted under the conveying surface;

a pusher blade positioned such that a portion thereof is generally above the conveying surface and at least one portion thereof extends between an adjacent pair of the rollers and connects to the first carriage;

a drive unit mounted under the conveying surface to selectively drive the second carriage; and a multiplier unit interconnecting the first and second carriages and configured to move the first carriage relative to the second carriage in relation to movement of the second carriage.

17. The article transfer assembly of claim 16 wherein the first carriage is moveable between a first position adjacent the first side of the conveying surface and a second position adjacent the second side of the conveying surface with the second carriage moving a distance less than a given distance between the first and second sides.

18. The article transfer assembly of claim 16 further comprising a biasing member positioned between the first carriage and the pusher blade such that the pusher blade is generally maintained in, but deflectable from, a plane parallel to the conveying surface.

19. The article transfer assembly of claim 16 the second carriage rides along a frame structure positioned under the conveying surface and the first carriage rides along the second carriage assembly.

20. The article transfer assembly of claim 19 wherein the multiplier unit includes spaced apart wheels extending from the second carriage and a band positioned about the wheels and fixed at a first position to the frame structure and at a second position to the first carriage.

* * * * *